Feb. 27, 1934.   M. S. LOWER   1,949,393
DOLL JOINT
Filed April 8, 1933
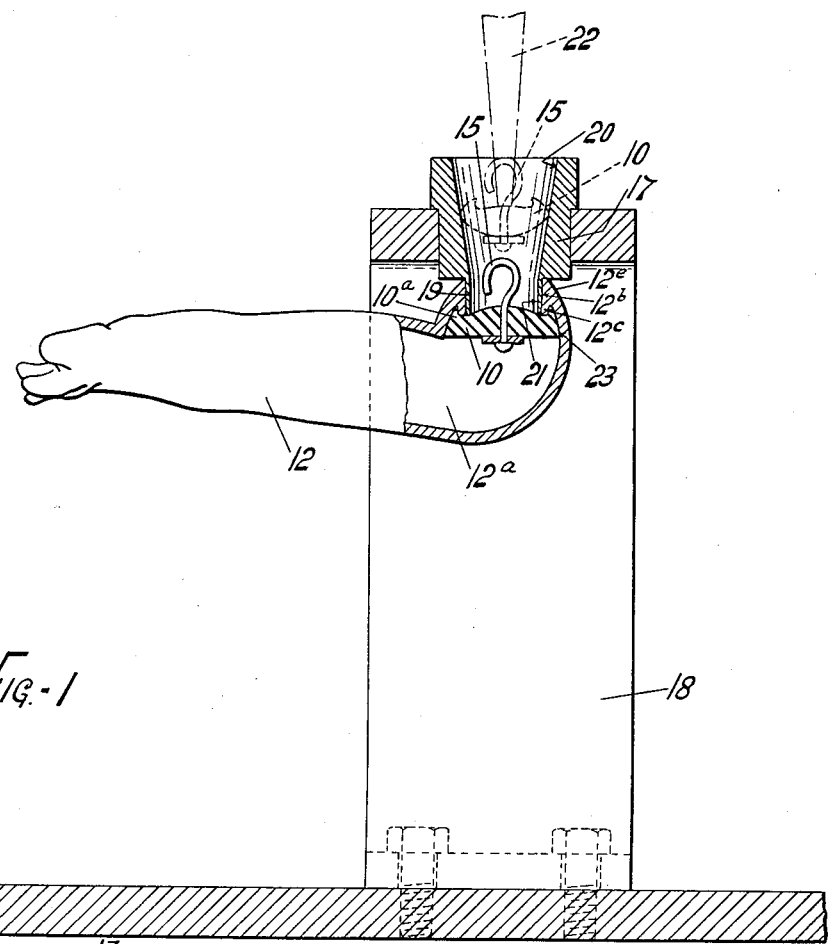
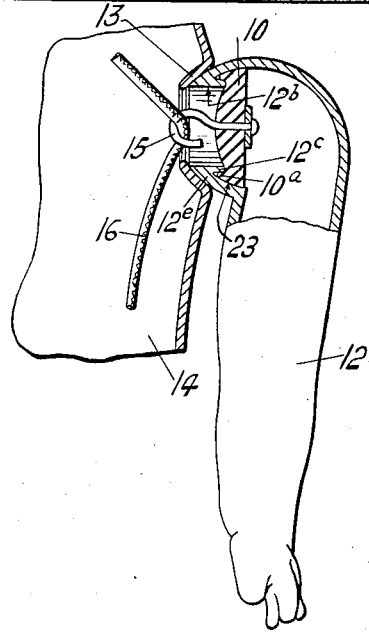
INVENTOR
MELVIN S. LOWER
BY Ely & Barrow
ATTORNEYS Patented Feb. 27, 1934

1,949,393

UNITED STATES PATENT OFFICE 1,949,393

DOLL JOINT

Melvin S. Lower, Wadsworth, Ohio, assignor to The Sun Rubber Company, Barberton, Ohio, a corporation of Ohio Application April 8, 1933. Serial No. 665,078

2 Claims. (Cl. 46—40)

This invention relates to joints for dolls and similar jointed structures and to procedure and apparatus for making same.

The general purpose of the invention is to provide an improved connection for doll and like joints, either in rigid or elastic structures of this kind, and procedure and apparatus for securing the connection in a doll part. Heretofore many different types of connections have been suggested and utilized, but these are not entirely satisfactory since the parts to be jointed are frequently damaged upon the insertion of the connections therein. The purpose of the present invention is to provide a connection including an elastic disc for insertion into a doll part and to provide procedure and apparatus for inserting and securing said disc in place without injuring said doll part.

The foregoing and other purposes of the invention are attained in the doll joint illustrated in the accompanying drawing. It is to be understood that the invention is not limited to the form thereof shown and described.

Of the accompanying drawing,

Figure 1 is a sectional elevation of an apparatus embodying and illustrating the method of the invention; and Figure 2 is a sectional elevation of an improved doll joint embodying the invention.

Referring to the drawing, the improved joint connection comprises a comparatively thick, elastic, vulcanized rubber disc 10 which is capable of being distorted when forced through an aperture smaller than the disc but which is preferably sufficiently stiff because of its thickness to offer substantial resistance to distortion to a smaller diameter. The lower surface of said disc is preferably smooth at least adjacent the edge thereof, but the upper surface of the disc at its edge is preferably provided with a hooking flange 10a.

A doll part, indicated at 12, to which the improved connection is to be secured and which may be either of stiff or flexible, elastic material is formed hollow as at 12a and is formed with an aperture as at 12b smaller than the disc 10 and surrounded on the inside of the part 12 with a hooking flange 12c adapted for hooking engagement with flange 10a of disc 10 as shown in Figures 1 and 2.

The part 12 is preferably formed with a portion 12e about the opening 12b providing a rounded, male, universal joint member for fitting in a rounded, universal joint socket 13 in a part 14 such as doll body to which part 12 is to be joined and disc 10 has swiveled thereon a hook or like element 15 extending upwardly of disc 10 and adapted to be engaged with the usual flexible, elastic, tension member 16 in the doll body 14.

As shown in Figure 1, a sleeve 17 supported on a suitable bracket 18 may be provided with a reduced end 19 of an outer diameter to slidably receive part 12 thereon with said sleeve end 19 projecting into opening 12b, the other end of sleeve 17 tapering on its inside surface from a diameter at 20 substantially equal to or larger than the diameter of disc 10 to a small diameter at 21 in the reduced end 19.

In securing the connection in the part 12, the disc 10 is preferably first dipped in a vulcanizable rubber cement and then forced down through the sleeve 17 as indicated in dotted lines in Figure 1, a suitable tool such as a pair of pliers 22 being engaged with hook 15 for this purpose, the disc 10 being forced through the sleeve 17 into the doll part 12 whereupon the disc expands to its normal size. The disc 10 is then drawn upwardly to cause the hooking flange 10a to hook onto flange 12c. When the discs are first coated with vulcanizable cement, this causes the joint at 23 between the disc 10 and part 12 to become bonded by vulcanization of the cement and provides a further means of securing the disc 10 in place.

Modifications of the invention may be resorted to without departing from the spirit thereof or the scope of the appended claims.

What is claimed is:—

1. A joint for dolls or the like comprising co-operating apertured hollow doll parts, one of said parts having an opening therein with an inwardly extending flange, a flexible elastic rubber disc inserted in said one doll part and having an outwardly projecting flange for engaging with said inwardly extending flange, and an attaching element swiveled on said disc and having means thereon adapted to be engaged to secure said one doll part to said other doll part, said disc being adhesively bonded to said one doll part.

2. A joint for dolls or the like comprising co-operating, apertured, hollow doll parts, one of said parts having an opening therein with an inwardly extending flange, a comparatively thick, comparatively stiff but somewhat flexible, elastic disc of rubber inserted in said doll part through said opening inwardly of said flange and normally of such diameter as to lie in substantial underlapping relationship with said flange at the inside of said opening, and an attaching element swiveled in said disc and having means thereon adapted to be engaged to secure said one doll part to said other doll part, said disc being capable of being flexed throughout its area upon application of substantial pressure to the periphery thereof to assume a substantial concavo-convex formation with an overall diameter such as to permit its insertion through said opening without substantial distortion of said inwardly extending flange, said disc because of its stiffness being highly resistant to removal from said joint by pulling apart the joint members.

MELVIN S. LOWER.